United States Patent
Morton

(10) Patent No.: US 7,164,807 B2
(45) Date of Patent: Jan. 16, 2007

(54) METHOD AND SYSTEM FOR AUTOMATICALLY REDUCING ALIASING ARTIFACTS

(75) Inventor: Roger R. A. Morton, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 817 days.

(21) Appl. No.: 10/422,457

(22) Filed: Apr. 24, 2003

(65) Prior Publication Data

US 2004/0213480 A1  Oct. 28, 2004

(51) Int. Cl.
G06K 9/40 (2006.01)
G06K 9/00 (2006.01)

(52) U.S. Cl. ...................... 382/269; 382/275

(58) Field of Classification Search ............ 382/167, 382/172, 219, 220, 254, 269, 275, 260–264, 382/276–277, 257, 294, 298–299; 358/518; 348/97, 104, 241, 335, 342; 359/571, 640
See application file for complete search history.

(56) References Cited

U.S. PATENT DOCUMENTS

| | | | | |
|---|---|---|---|---|
| 4,989,959 A | * | 2/1991 | Plummer | 359/640 |
| 5,166,783 A | | 11/1992 | Hodgson | 358/54 |
| 5,206,919 A | | 4/1993 | Keating | |
| 5,322,998 A | * | 6/1994 | Jackson | 250/216 |
| 5,467,412 A | | 11/1995 | Capitant et al. | 382/167 |
| 5,576,837 A | * | 11/1996 | Strolle et al. | 386/33 |
| 5,682,266 A | * | 10/1997 | Meyers | 359/571 |
| 5,778,105 A | | 7/1998 | Shively | |
| 5,956,424 A | | 9/1999 | Wootton et al. | |
| 6,040,857 A | * | 3/2000 | Hirsh et al. | 348/241 |
| 6,424,749 B1 | * | 7/2002 | Zhu et al. | 382/260 |
| 6,937,283 B1 | * | 8/2005 | Kessler et al. | 348/342 |
| 7,103,235 B1 | * | 9/2006 | Tener et al. | 382/294 |
| 2004/0213479 A1 | * | 10/2004 | Morton | 382/269 |
| 2004/0213480 A1 | * | 10/2004 | Morton | 382/269 |

FOREIGN PATENT DOCUMENTS

| | | |
|---|---|---|
| EP | 0 644 696 A2 | 3/1995 |
| EP | 1 032 196 A | 3/2000 |
| EP | 1 083 737 A2 | 3/2001 |
| EP | 1 150 513 A | 10/2001 |

(Continued)

OTHER PUBLICATIONS

"Spatial summation properties of directionally selective mechanisms in human vision" by Stephen J. Anderson and David C. Burr. J. Opt. Soc. Am. A, vol. 8, No. 8, Aug. 1991.

(Continued)

*Primary Examiner*—Amir Alavi
(74) *Attorney, Agent, or Firm*—David M. Woods

(57) ABSTRACT

Artifacts in an image introduced by sub-Nyquist aliasing are reduced below a visually perceptible level by a method comprising the steps of: providing an input image having sub-Nyquist aliasing artifacts; using a visual perception algorithm to identify the location and characteristics of the sub-Nyquist aliasing artifacts, thereby generating artifact coordinates and parameters; and processing the sub-Nyquist aliasing artifacts by reference to the artifact coordinates and parameters to reduce their visibility, thereby providing an artifact corrected image.

13 Claims, 4 Drawing Sheets

FOREIGN PATENT DOCUMENTS

EP    1 202 220 A2    5/2002

OTHER PUBLICATIONS

"The Impact of Aliasing and Quantization on Motion Compensation" by Christoph Stiller. INRS-Telecommunications. 1995, pp. 209-214.

Contrast Sensitivity of the Human Eye and Its Effects on Image Quality, SPIE Optical Engineering Press, 1999, pp. 27-60.

"Probabilistic anti-aliasing methods for dynamic variable resolution images" by Francesco M. Panerai and Richard D. Juday. SPIE vol. 2847, 1997, pp.130-138.

"Interaction of Image Quality Metrics" by Roger R.A. Morton, Michelle A. Maurer, Christopher L. DuMont, 36th Advanced Motion Imaging Conference, Feb. 7-9, 2002, Dallas, Texas.

"Multiframe Wiener Restoration of Image Sequences" in Motion Analysis and Image Sequence Processing, ed. by M.I. Sezan and R.L. Lagendjik, Kluwer Publishers, 1993, pp. 375-409.

* cited by examiner

METHOD AND SYSTEM FOR AUTOMATICALLY REDUCING ALIASING ARTIFACTS

FIELD OF THE INVENTION

This invention relates to the field of digital imaging, and in particular to motion picture imaging using digital processing methods.

BACKGROUND OF THE INVENTION

When properly designed, digital processing methods may be used effectively to enhance, store and transmit images. However, digital methods introduce artifacts including aliasing, missing code values, irreversible introduction of contours, and loss of data. More specifically, it has been shown that aliasing can occur at image frequencies below the Nyquist frequency of the sampling array used in the digital system (see Roger R. A. Morton, Michelle A. Maurer and Christopher L. DuMont, *SMPTE Conference Image Quality: Theory and Application Proceedings*, Dallas, Tex., Feb. 7–9, 2002). This means that objectionable artifacts are introduced into images at spatial frequencies normally not associated, given the capture parameters, with the aliasing effect. Many of these artifacts are particularly noticeable with motion picture images. Given such understanding, workable techniques are needed for reducing sub-Nyquist aliasing artifacts from the image output of digital systems, particularly from the motion output of digital motion systems.

SUMMARY OF THE INVENTION

The present invention is directed to overcoming one or more of the problems set forth above. Briefly summarized, according to one aspect of the present invention, the invention overcomes the artifacts introduced by sub-Nyquist aliasing by reducing the aliasing artifacts in an image below a visually perceptible level, where the method comprises the steps of: providing source image data as an input image having sub-Nyquist aliasing artifacts; using a visual perception algorithm to identify the location and characteristics of the sub-Nyquist aliasing artifacts, thereby generating artifact coordinates and parameters; and processing the sub-Nyquist aliasing artifacts by reference to the artifact coordinates and parameters to reduce their visibility, thereby providing an artifact corrected image.

From another aspect of the present invention, the invention comprises a system for reducing sub-Nyquist aliasing artifacts in an image below a visually perceptible level, where the system includes: a source of image data having sub-Nyquist aliasing artifacts; a visual perception stage utilizing a visual perception algorithm to identify the location and characteristics of the sub-Nyquist aliasing artifacts, thereby generating artifact coordinates and parameters; and an artifact removal stage for processing the sub-Nyquist aliasing artifacts by reference to the artifact coordinates and parameters to reduce their visibility, thereby providing an artifact corrected image.

While the aliasing is not always totally removed, the advantage of the method according to the present invention is that aliasing is rendered less visible in situations where it might otherwise be visible, all the while using a minimal amount of processing. This provides a feed forward method of minimizing certain aliasing artifacts while not imposing a heavy computational load on the image processing system.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing aliasing reduction are well known, the present description will be directed in particular to attributes forming part of, or cooperating more directly with, a method and system in accordance with the present invention. Method and system attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer or a workstation of the type used in a post production facility to process motion picture film. Consequently, the computer system will not be discussed in detail herein. It is also instructive to note that the images are either directly input into the computer system (for example by a digital camera) or digitized before input into the computer system (for example by scanning an original, such as a silver halide film).

Figure 7:
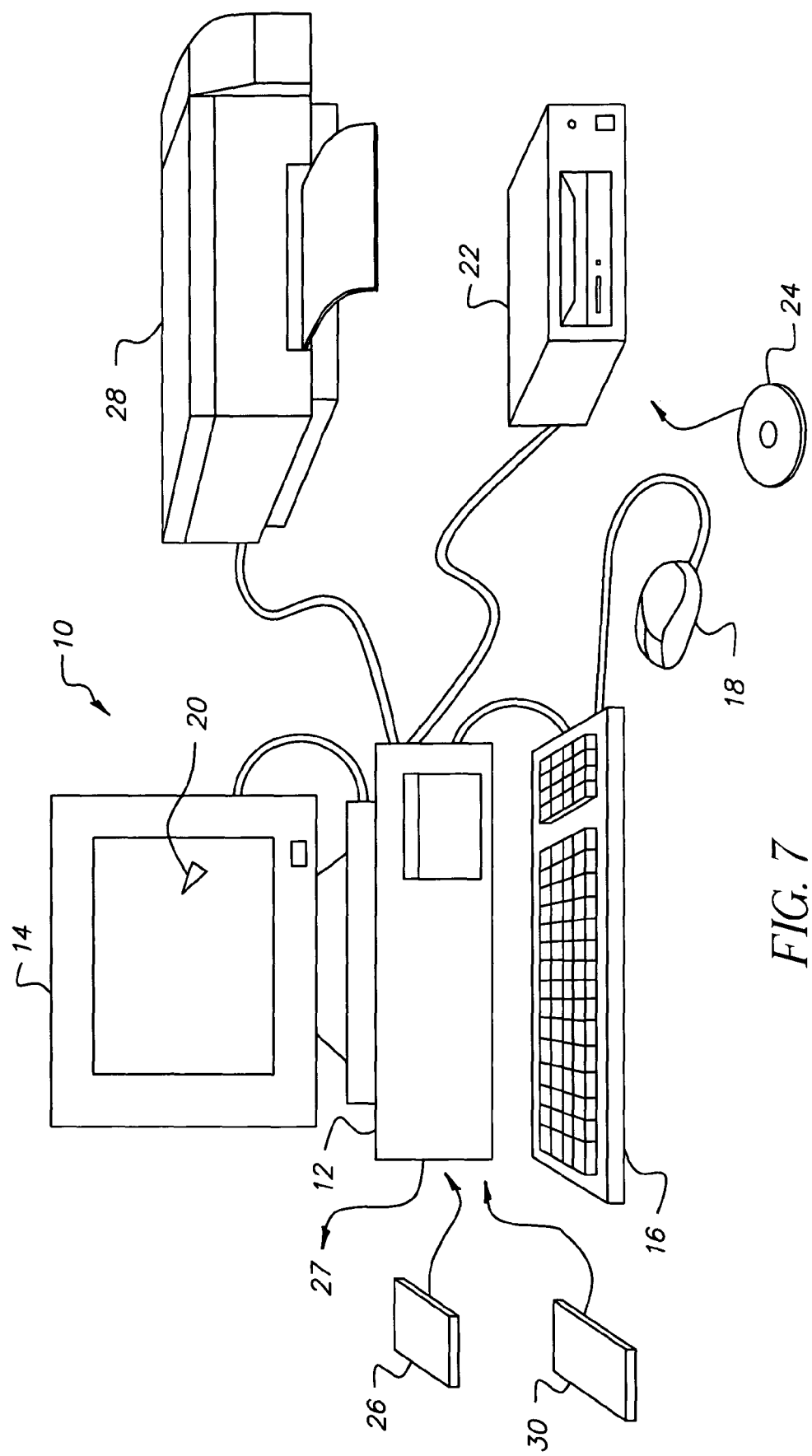
FIG. 7 is a perspective diagram of a computer system for implementing the present invention.

Referring first to FIG. 7, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 12 for receiving and processing software programs and for performing other processing functions. A display 14 is electrically connected to the microprocessor-based unit 12 for displaying user-related information associated with the software, e.g., by means of a graphical user interface. A keyboard 16 is also connected to the microprocessor based unit 12 for permitting a user to input information to the software. As an alternative to using the keyboard 16 for input, a mouse 18 may be used for moving a selector 20 on the display 14 and for selecting an item on which the selector 20 overlays, as is well known in the art.

A compact disk-read only memory (CD-ROM) 22 is connected to the microprocessor based unit 12 for receiving software programs and for providing a means of inputting the software programs and other information to the microprocessor based unit 12 via a compact disk 24, which typically includes a software program. In addition, a floppy disk 26 may also include a software program, and is inserted into the microprocessor-based unit 12 for inputting the software program. Still further, the microprocessor-based unit 12 may be programmed, as is well known in the art, for storing the software program internally. The microprocessor-based unit 12 may also have a network connection 27, such as a telephone line, to an external network, such as a local area network or the Internet. A printer 28 is connected to the microprocessor-based unit 12 for printing a hardcopy of the output of the computer system 10.

Images may also be displayed on the display 14 via a personal computer card (PC card) 30, such as, as it was formerly known, a PCMCIA card (based on the specifications of the Personal Computer Memory Card International Association) which contains digitized images electronically embodied in the card 30. The PC card 30 is ultimately inserted into the microprocessor based unit 12 for permitting visual display of the image on the display 14. Images may also be input via the compact disk 24, the floppy disk 26, or the network connection 27. Any images stored in the PC card 30, the floppy disk 26 or the compact disk 24, or input through the network connection 27, may have been obtained from a variety of sources, such as a digital camera (not shown) or a scanner (not shown). In accordance with the invention, the images are typically stored in a digital intermediate form obtained, e.g., by scanning a motion picture film with a telecine machine. The anti-aliasing processing disclosed herein may then be performed by hardware and/or software that directly takes the data flowing from the telecine machine and process it at the same rate as the telecine machine generates the data. It may also be performed in a workstation used in postproduction for the generation of special effects. Alternatively, the digital images could be digitally originated directly from a digital motion picture camera and transferred to the digital intermediate form.

This invention involves locating and reducing the visibility of sub-Nyquist aliasing artifacts by, e.g., tuning the frequency of a filter to remove the aliasing frequency artifacts or reducing the contrast of detail in areas where artifacts in the detail would be objectionable, especially due to motion. Notwithstanding this main thrust of the invention, it is also projected to be useful with stationary images, including stationary images within a motion stream, that due to aliasing artifacts do not faithfully represent the original scene. Inasmuch as it has been shown that aliasing can occur at image frequencies below the Nyquist frequency of the sampling array, the techniques disclosed herein can identify and address the presence of these artifacts.

Understanding the interaction between aliasing, limiting resolution and pixel count requires knowledge of the mechanisms that cause aliasing. To begin with, aliasing may be defined as "any artifact inserted into image data as a result of pixels interacting with scene content". From this definition, it can be understood that aliasing is scene dependent, and consequently there are scenes where aliasing is not visible. However, aliasing appears in many different ways in motion images, including artificial motion in high detail areas, pools of noise in textures, moving edges along isolated lines, or moving bands of lines across regular textures.

Aliasing effects are sometimes referred to as "basket weave", "alias contours", "shimmering", "fizzing", and "buzzing". Seen in many image areas including clothing, concrete and stone textures, grasses, and on the edges of lines, these artifacts often appear unexpectedly. In indoor and outdoor scenes, such artifacts appear on textures viewed straight on as the textures move or as their angle changes, as for example when textured material wraps around an arm or a shoulder. In addition, motion aliasing can produce surprising lines and colors that dance across regular scene patterns. Perceptually, this can be a serious problem as the human visual system is particularly alerted by motion. Aliasing effects, even in small regions, are thus immediately detectable by the human visual system.

Many methods are available to reduce aliasing artifacts below visually perceptible levels. The most robust involve increasing pixel count or reducing image detail. It is well known that artifacts are seen when their magnitude is such that they are perceptible to the viewer. Depending on their training and acuity, different viewers have different levels of perceptibility of artifacts. In addition, an individual viewer's position with respect to the display or projection screen will affect artifact perception. The literature on human vision discusses the threshold perception of viewers (see, for example, S. J. Anderson and D. C. Burr, "Spatial Summation Properties of Directionally selective Mechanisms in Human Vision", *J. Opt. Soc. Am. A*, 8:1330–1339, August 1991).

The method described here according to the invention involves modeling artifact perception and then modifying the images for those areas where the artifact is predicted by the model to be visible. In some cases, the modification of the image may simply involve reducing the contrast in the area where the perceptible artifact is present. In other cases, more complex removal methods may involve identifying the artifact, using the source signal frequency and the scanning pixel pattern for predicting the artifact frequency components, and then removing those frequency components from the image in the region of the artifact.

Artifact identification may be performed by scanning the original image or scene in an artifact free manner at a high resolution. Next, the pixel resolution of the image is reduced to the pixel resolution corresponding to a selected display resolution. The high-resolution artifact free image is then compared to the reduced resolution image, and moiré or similar aliasing artifacts are detected at a level generally corresponding to a skilled viewer situated at between 0.5 and 2 picture heights from the screen.

Figure 1:
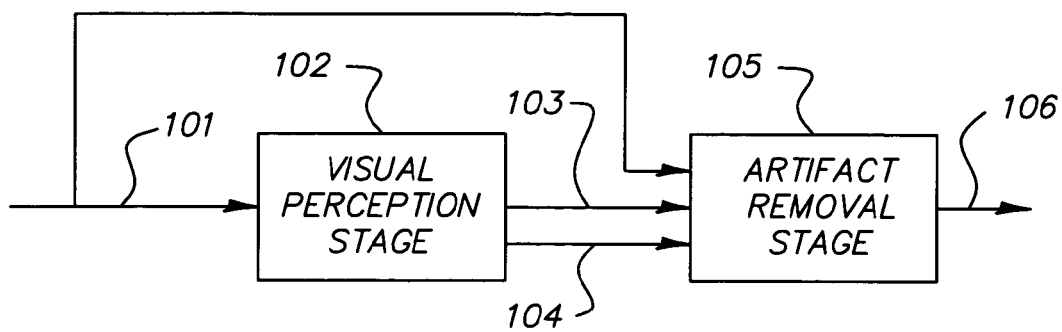
FIG. 1 shows a high level block diagram of the process for removing artifacts according to the invention.

Referring now to FIG. 1, there is shown an overall block diagram of the process and system according to the invention. The source image data from which artifacts are to be removed enters as an input image on an input line 101 to a visual perception stage 102, which uses a visual perceptual algorithm to sense the location and nature of the artifacts.

The input image is typically a reduced resolution version of the source image data, as presented by a selected display, and therefore contains the aforementioned sub-Nyquist artifacts. The visual perception stage 102 produces an output on a line 103 including x/y coordinates (and optionally for a motion picture, frame numbers) indicating artifact location. The visual perception stage 102 also produces artifact characteristics, which are output on a line 104. Both the coordinates on the line 103 and the characteristics on the line 104 are applied to an artifact removal stage 105, which also receives the image data from which the artifacts are to be removed on the line 101. The artifact removal stage 105 provides an artifact corrected image on an output line 106.

Figure 2:
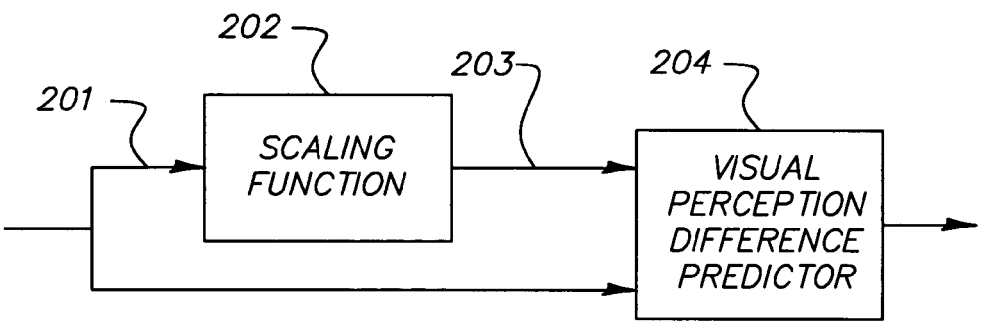
FIG. 2 is a block diagram showing further details of the visual perception stage shown in FIG. 1.

FIG. 2 shows further details of the visual perception stage 102, which is shown to include a scaling function 202 and a visual perception difference predictor 204. The incoming source image data which has been scanned or otherwise provided in a substantially artifacts free manner at a high resolution, e.g., with a high resolution scanner, enters on a line 201 and passes to the scaling function 202, which reduces the pixel resolution of the image to a selected display resolution. The selected display resolution represents the screen actually viewed by a typical viewer, which may range, e.g., from a CRT monitor screen to a screen in a theater. Various types of known resolution reduction algorithms may be used, including without limitation, for example, bi-linear, Gaussian or bi-cubic interpolation. The reduced resolution pixel image is output on a line 203 and passes to the visual perception difference predictor 204. This predictor takes the difference between the two images by first scaling the image on the line 203 back to the original resolution of the source image occurring on the line 201 and then performing difference assessments. These differences are then assessed by a visual modeling function for their visual impact.

Figure 3:
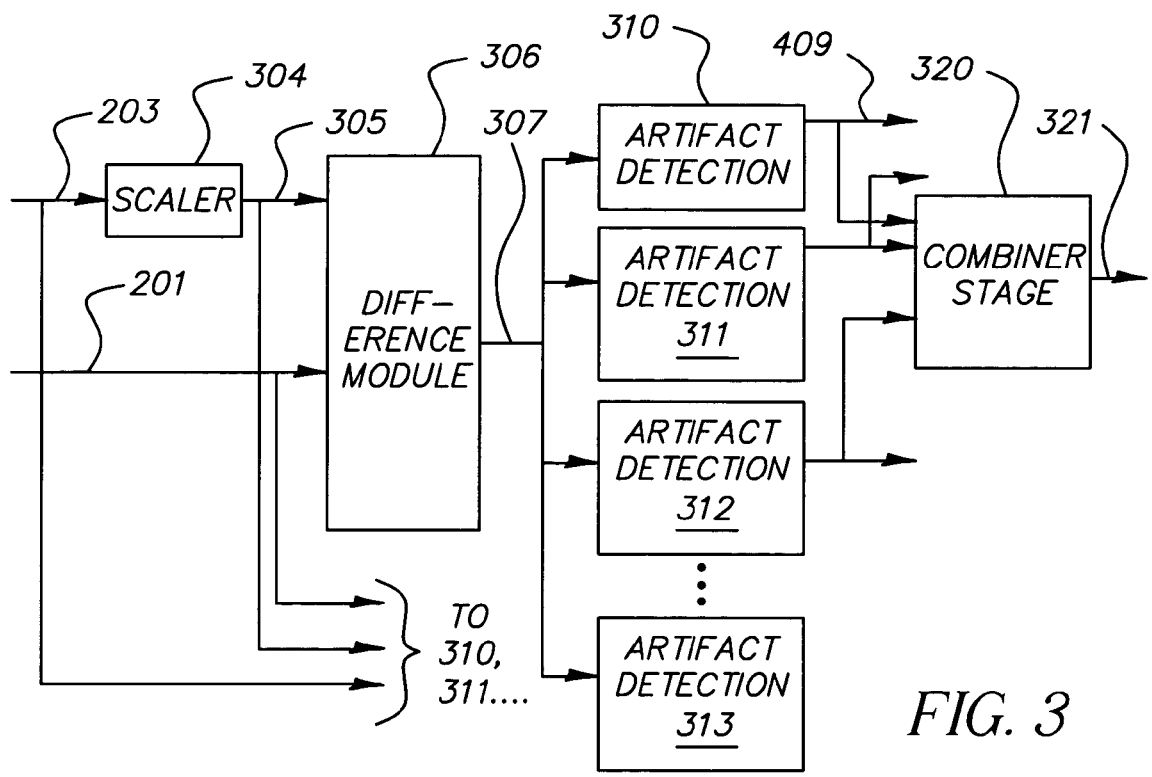
FIG. 3 is a block diagram showing further details of the visual perception difference predictor shown in FIG. 2.

Further details of the visual perception difference predictor 204 are shown in FIG. 3, where the reduced resolution image is initially scaled up by a scaler 304 to the resolution of the source image on the line 201. This higher resolution image on a line 305 is passed to a difference module 306, which takes the difference between the artifact free source image 201 and the scaled image 305. The difference amplitude signal is then passed on a line 307 to a variety of artifact detection processes 310, 311, 312, 313 . . . , which also receive the original source image from the line 201, the scaled image from the line 203, and the upscaled image from the line 305. The artifact detection processes 310, 311, 312 and 313 provide information about the artifacts, including artifact parameters indicating artifact type, artifact location and other artifact parameters such as frequency, phase and other information necessary for artifact removal. These parameters are combined in a combiner stage 320 and outputted on a line 321 to the artifact removal stage 105.

Figure 4:
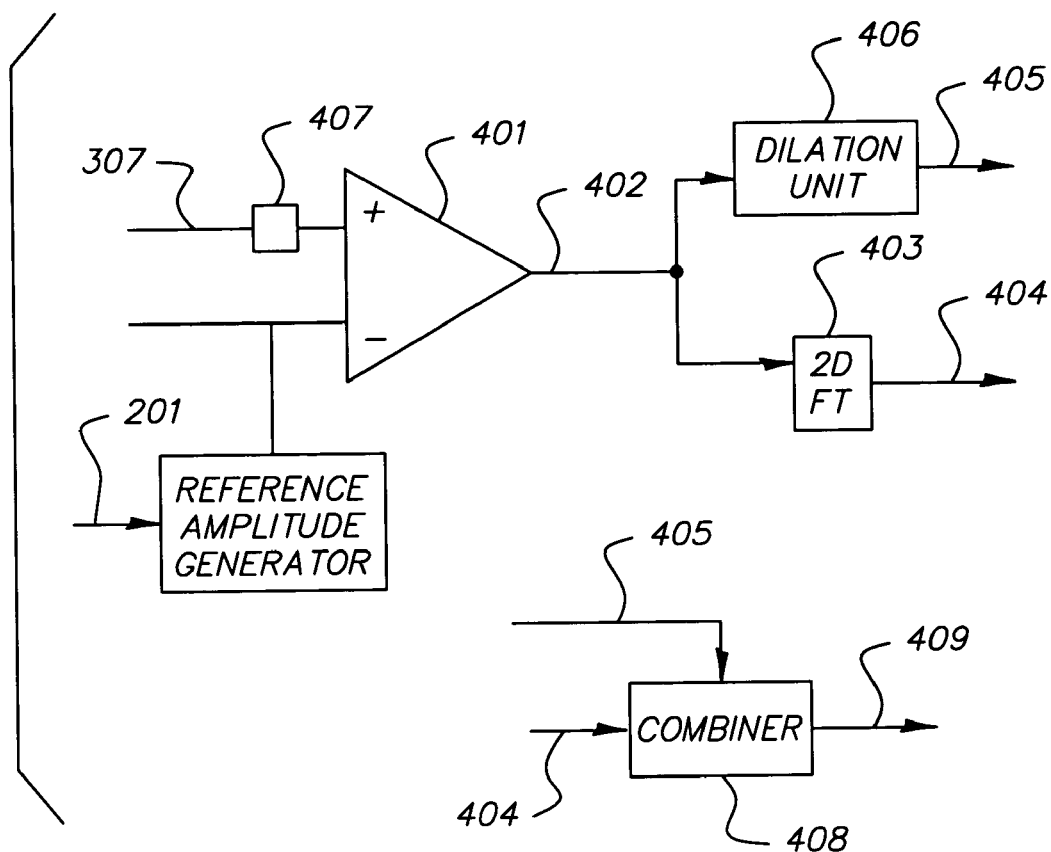
FIG. 4 is a block diagram showing an example of an artifact detection process shown in FIG. 3.

FIG. 4 shows an example of an artifact detection process 310, 311, 312, or 313. The difference amplitude signal on the line 307 enters a threshold stage 401 for a given artifact detection process (for example, for an artifact detection process 310), which compares the difference amplitude on the line 307 with a reference amplitude produced by an amplitude generator 401*a*, which is a function of the artifact free signal 201. The purpose of this function is to take into account visual perception of differences across the visual dynamic range. A perceptible difference signal is outputted on line a 402 to a regional 2-D Fourier transform analyzer 403, which outputs a signal on a line 404 identifying the frequency and 2-dimensional phase of the artifacts indicated by the difference signal on the line 402.

A dilation unit 406 dilates the artifact areas to form an artifact region to identify the region over which the artifact lies. The artifact region information is output as a region signal on a line 405. The signals on lines 405 and 404 then enter a combiner stage 408, which outputs positional frequency and phase characteristics on a line 409 for a given region together with the type of artifact. This information passes to the artifact removal stage 105.

Figure 5:
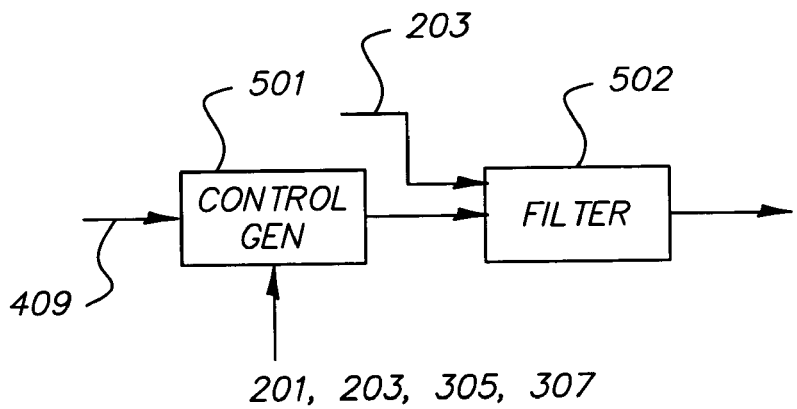
FIG. 5 is a block diagram showing further details of the artifact removal stage shown in FIG. 1.

FIG. 5 shows an example of the artifact removal stage 105 using the phase and region information provided on the line 409 from the combiner stage 408. The information enters the control signal generator 501 together with image information, for example, from lines 201, 203 and 305 as well as difference information from the line 307. Based on this information, control signals are sent to a notch or band stop filter 502 to tune the filter to remove the aliasing frequency artifacts identified in FIG. 4 from the image on the line 203.

Note that artifact data may be merged in the function represented by the combiner stage 320; however, where there is a one on one correspondence between artifact detectors 310, 311, 312 and 313, and artifact removal functions, the merging function 320 may not be required as artifact data may be sent directly to a specific artifact removal stage.

A further method of detecting visually detectable artifacts is to check if the difference in the visual difference predictor exceeds the levels defined by the levels predicted in Peter G. J. Barten, "Contrast Sensitivity of the Human Eye and Its Effects on Image Quality", *SPIE Optical Engineering Press*, 1999. pp 27–60 and specifically equation 3.26.

Figure 6:
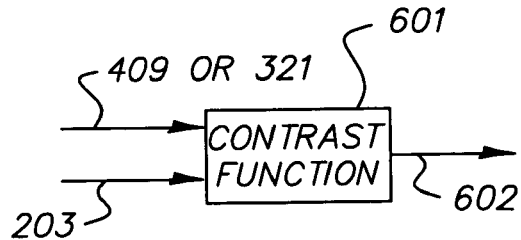
FIG. 6 is a block diagram showing details of an alternative artifact removal stage.

FIG. 6 shows an alternate method of removing artifacts. Data describing the region of the artifact enters, for example, on lines 409 or 321 and the image enters on the line 203. The artifact location is identified from line 409 or 321 and the image contrast in that region is reduced by a contrast function applicator 601 to produce a modified image on line 602 from the contrast function applied in applicator 601, which reduces the contrast in the area where the artifact lies.

Alternately in such a region the power spectrum of the signal may be measured and if it falls above a visual threshold of a detectability function, either the image contrast or the frequency response may be adjusted so that the power spectrum in the region of the image that is aliasing falls below the visual threshold of detectability function.

It facilitates understanding of the invention to recall that the process involves modeling artifact perception in the visual perception stage 102 and then modifying the input images in the artifact removal stage 105 for those areas where the artifact is predicted by the model to be visible. Such input images correspond to images actually displayed in a selected display system. According to the model used in the visual perception stage 102, artifact identification is performed by obtaining a high resolution version of the original image or scene in a substantially artifact free manner. Typically, the high resolution version is available to the display system as the transmitted motion picture signal. Next, the pixel resolution of the high resolution image is reduced to the pixel resolution corresponding to the display resolution of the selected display system, therefore essentially replicating the input images. The high-resolution artifact free image is then compared to the reduced resolution image, and moire or similar aliasing artifacts are detected at a level generally corresponding to a skilled viewer situated at a particular viewing distance, e.g., between 0.5 and 2 picture heights from the screen. In some cases, the modification of the image may simply involve reducing the contrast in the area where the perceptible artifact is present. In other cases, more complex removal methods may involve identifying the artifact, using the source signal frequency and the scanning pixel pattern for predicting the artifact frequency components, and then removing those frequency components from the image in the region of the artifact. In either case, this modification is applied to the input images in the artifact removal stage 105, which as shown in FIGS. 5 and 6 is equivalent to applying the modification to the reduced resolution image.

Figure 8:
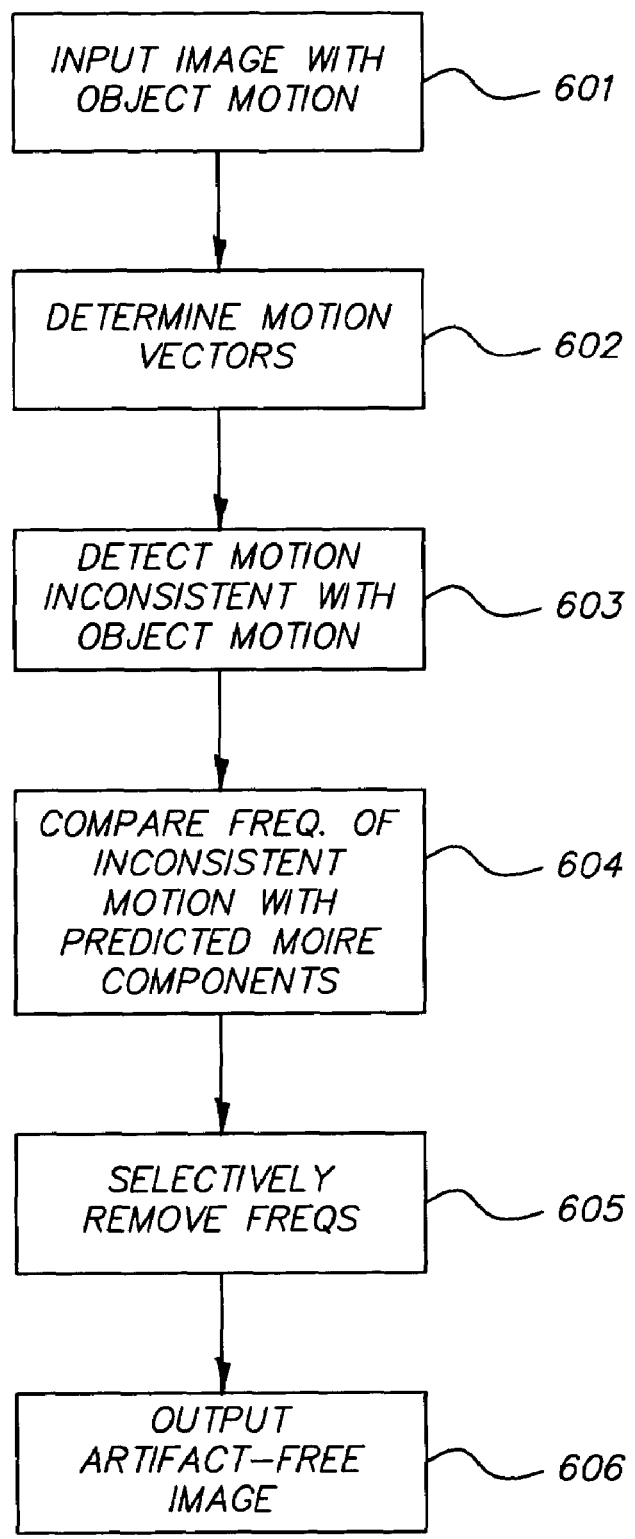
FIG. 8 is a flow chart for an alternative embodiment of a process for removing artifacts according to the invention

In an alternative embodiment to the embodiment described in relation to FIG. 1 through 6, artifacts may be detected as motion impressed on motion. For example, as shown in FIG. 8, in an input image with object motion (input in step 601) motion image artifacts may appear as movement in direction that differs from the actual movement of the scene. According to this approach, motion vectors of objects are determined between scenes (in step 602); there are well known techniques for determining motion vectors, see for example M. K. Ozkan, M. I. Sezan, A. T. Erdem and A. M. Tekalp, "Multiframe Wiener Restoration of Image Sequences" in *Motion Analysis and Image Sequence Processing*, ed. By M. I. Sezan and R. L. Lagendjik, Kluwer Publishers, 1993. Then, any motion that is not consistent with detected object motion (as detected in step 603) and that has a frequency as predicted (in step 604) by the moiré relationship between scene pixels and scene content (being that the artifact frequency will be a harmonic of the sum and difference frequency of the image content frequency and the pixel frequency in the direction of the image content frequency) will be due to motion aliasing artifacts.

Once a signal is detected whose frequency satisfies a harmonic of the sum or difference mentioned above and which indicates movement in a direction inconsistent with the motion of the objects of the scene, it may be selectively removed (in step 605) by filtering the input signal, e.g., by configuring a 2-dimensional filter to act as a band stop filter for the identified artifacts' frequencies, thereby producing a substantially artifact-free signal (in step 606).

The invention has been described with reference to one or more preferred embodiments. However, it will be appreciated that variations and modifications can be effected by a person of ordinary skill in the art without departing from the scope of the invention.

PARTS LIST 10 computer system
12 microprocessor-based unit
14 display
16 keyboard
18 mouse
20 selector
22 CD-ROM
24 CD
26 floppy disk
27 network connection
28 printer
30 PC card
101 input line
102 visual perception stage
103 line with x,y coordinates/frame numbers
104 line with artifact characteristics
105 artifact removal stage
106 output line
201 line with artifact free image
202 scaling function
203 line with reduced pixel image
204 visual perception difference predictor
304 scaler
305 line with scaled up image
306 difference module
307 line with differences
310 artifact detection process
311 artifact detection process
312 artifact detection process
313 artifact detection process
320 combiner stage
321 output line
401 artifact detection process threshold
401a reference amplitude generator
402 line with perceptible difference signal
403 2D Fourier transform analyzer
404 output line
405 line with artifact region information
406 dilation unit
408 combiner stage
409 line with artifact characteristics
501 control signal generator
502 contrast function applicator
601 input image with object motion
602 determine motion vector
603 detect inconsistent motion
604 compare frequencies
605 selectively remove frequencies
606 output substantially artifact free image

What is claimed is:

1. A method for reducing sub-Nyquist aliasing artifacts in an image below a visually perceptible level, said method comprising the steps of:
   (a) providing source image data as an input image having sub-Nyquist aliasing artifacts;
   (b) using a visual perception algorithm to identify the location and characteristics of the sub-Nyquist aliasing artifacts, thereby generating artifact coordinates and parameters; and
   (c) processing the sub-Nyquist aliasing artifacts by reference to the artifact coordinates and parameters to reduce their visibility, thereby providing an artifact corrected image.

2. The method as claimed in claim 1 wherein step (b) further comprises the steps of:
   (d) providing the source image data in a substantially artifact free manner as a high resolution source image;
   (e) scaling the high resolution source image to reduce the pixel resolution of the high resolution source image to a display resolution, thereby generating a reduced resolution image; and
   (f) predicting the visual perception difference between the high resolution source image and the reduced resolution image, thereby identifying the artifacts in the reduced resolution image.

3. The method as claimed in claim 2 wherein step (f) further comprises the steps of:
   (g) scaling the reduced resolution image back up to the resolution of the high resolution source image, thereby producing an upscaled image;
   (h) differencing the high resolution source image and the upscaled image and providing difference components; and
   (i) using the difference components and the high resolution source image, the scaled image and the upscaled image to determine parameters of the artifacts, said parameters including artifact type, artifact location, and other parameters such as artifact frequency and phase.

4. The method as claimed in claim 3 wherein step (i) further comprises the steps of:
(j) thresholding the magnitude of the difference components against a reference amplitude that is a function of visual perception of the difference components, thereby producing a thresholded difference component;
(k) identifying the frequency and 2-dimensional phase of artifacts indicated by the thresholded difference components;
(l) dilating an area of the artifact, thereby identifying a region over which the artifact lies; and
(m) using the outputs of steps (k) and (l) to output the parameters of the artifacts.

5. The method as claimed in claim 4 wherein the step (c) in claim 1 of removing the artifacts comprises the steps of;
(n) using the output of step (m) as well as the source image, the scaled image, the upscaled image and the difference components to generate control signals for a filtering operation; and
(o) based on the control signals, using the filtering operation to remove the aliasing frequency artifacts from the input image.

6. The method as claimed in claim 4 wherein the step (c) in claim 1 of removing the artifacts comprises the step of using the regional output of steps (l) or (m) to reducing contrast in the area where the artifact lies.

7. A method for reducing sub-Nyquist aliasing artifacts in an image below a visually perceptible level, said method comprising the steps of:
(a) providing a sequence of input images comprising scene pixels and scene content;
(b) determining motion vectors of objects appearing in the images;
(c) detecting artifact motion that is inconsistent with the motion vectors, said artifact motion having an artifact frequency predicted from a relationship between a scene pixel frequency and a scene content frequency;
(d) utilizing said artifact motion to identify sub-Nyquist motion aliasing effects and their artifact frequencies; and
(e) removing the motion aliasing effects from the input images by a filtering operation.

8. The method as claimed in claim 7 wherein the filtering operation applied in step (e) is a 2D filter that acts as a bandstop filter for the artifact frequencies.

9. A system for reducing sub-Nyquist aliasing artifacts in an image below a visually perceptible level, said system comprising: a source of image data having sub-Nyquist aliasing artifacts;
a visual perception stage utilizing a visual perception algorithm to identify the location and characteristics of the sub-Nyquist aliasing artifacts, thereby generating artifact coordinates and parameters; and
an artifact removal stage for processing the sub-Nyquist aliasing artifacts by reference to the artifact coordinates and parameters to reduce their visibility, thereby providing an artifact corrected image.

10. The system as claimed in claim 9 wherein the visual perception stage comprises:
a source of image data in a substantially artifact free manner, thereby providing a high resolution source image;
a scaler for scaling the high resolution source image to reduce the pixel resolution of the high resolution source image to a display resolution, thereby generating a reduced resolution image; and
a visual perception difference predictor for predicting the visual perception difference between the high resolution source image and the reduced resolution image, thereby identifying the artifacts in the reduced resolution image.

11. The system as claimed in claim 10 wherein the visual perception difference predictor comprises:
a scaler for scaling the reduced resolution image back up to the resolution of the high resolution source image, thereby producing an upscaled image;
a differencer for differencing the high resolution source image and the upscaled image and providing difference components; and
one or more artifact detection stages using the difference components and the high resolution source image, the scaled image and the upscaled image to determine parameters of the artifacts, said parameters including artifact type, artifact location, and other parameters such as artifact frequency and phase.

12. The system as claimed in claim 11 wherein the artifact detection stage comprises:
a thresholding circuit for thresholding the magnitude of the difference components against a reference amplitude that is a function of visual perception of the difference components, thereby producing a thresholded difference component;
a transform circuit for identifying the frequency and 2-dimensional phase of artifacts indicated by the thresholded difference component;
a dilation unit for dilating an area of the artifact, thereby identifying a region over which the artifact lies; and
a combiner stage using the outputs of the transform circuit and the dilation unit to output the parameters of the artifacts.

13. The system as claimed in claim 12 wherein the artifact removal stage comprises:
a control signal generator using the output of the combiner stage as well as the source image, the scaled image, the upscaled image and the difference components to generate filtering control signals; and
a filter using the control signals to remove the aliasing frequency artifacts from the input image.

* * * * *